(12) United States Patent
Johnston (10) Patent No.: US 7,875,222 B2
(45) Date of Patent: Jan. 25, 2011

(54) METHOD OF MAKING AN INJECTION MOLDED CONTAINER

(75) Inventor: Robert Johnston, Geddington (GB)

(73) Assignee: Dubois Limited (GB)

( * ) Notice: Subject to any disclaimer, the term of this patent is extended or adjusted under 35 U.S.C. 154(b) by 476 days.

(21) Appl. No.: 10/590,981

(22) PCT Filed: Mar. 13, 2006

(86) PCT No.: PCT/GB2006/000903

§ 371 (c)(1),
(2), (4) Date: Aug. 6, 2008

(87) PCT Pub. No.: WO2006/095202

PCT Pub. Date: Sep. 14, 2006

(65) Prior Publication Data

US 2008/0289980 A1    Nov. 27, 2008

(30) Foreign Application Priority Data

Mar. 11, 2005  (GB) ................................ 0505004.2

(51) Int. Cl.
*B29C 45/26* (2006.01)
*B29C 33/38* (2006.01)
(52) U.S. Cl. .................................... 264/219; 264/328.1
(58) Field of Classification Search ................ 264/219, 264/328.1, 328.7; 425/182, 183, 190, 195
See application file for complete search history.

(56) References Cited

U.S. PATENT DOCUMENTS

D286,463 S    11/1986  Sfikas
4,819,797 A    4/1989   Holmgren (Continued)

FOREIGN PATENT DOCUMENTS

EP    0233163 A1    8/1987

(Continued)

OTHER PUBLICATIONS

International Search Report WO2007047801A1, dated Feb. 20, 2007.
European Search Report EP1777707A1, dated Feb. 23, 2007.
International Search Report dated Jul. 13, 2006.

*Primary Examiner*—Jill L Heitbrink
(74) *Attorney, Agent, or Firm*—McDermott Will & Emery LLP (57) ABSTRACT

A method of making an injection moulded container for housing information storage media, e.g. a DVD, the container having a base portion (10) and a lid portion (11) moveable about a spine portion (12) between open and closed configurations and holding means (15) for holding the media within the container, the method involving the use of an injection moulding tool comprising two carrier units (40, 41) each adapted to receive a plurality of inserts therein which define a cavity for forming the container: a first set of the inserts (50-59) for forming a first set of features of the container being formed of a first material, e.g. steel, and a second set of inserts (42-45) for forming a second set of features of the container being formed of a second material, e.g a copper alloy, the first set of inserts (50-59) being machined to the required shape for fitting within the carrier units (40, 41) and for forming the first set of features and the second set of inserts (42-45) being machined so as to fit within the carrier units (40, 41) but one or more of the second set of inserts (42-45) being formed with excess material on surfaces thereof defining said second set of features pending a decision as to the precise shape of said second set of features, whereby once a decision has been made the tool can be completed by machining said excess material to the required shape and assembling the inserts in the mould.

17 Claims, 5 Drawing Sheets

U.S. PATENT DOCUMENTS

| | | | |
|---|---|---|---|
| D324,609 S | 3/1992 | Yasuhara et al. |
| D325,468 S | 4/1992 | Ohba |
| D335,215 S | 5/1993 | Stumpff |
| 5,267,647 A | 12/1993 | Stumpff et al. |
| D347,728 S | 6/1994 | Taniyama |
| 5,334,904 A | 8/1994 | Kramer |
| 5,381,894 A | 1/1995 | Misterka et al. |
| D359,193 S | 6/1995 | Minter |
| 5,531,322 A | 7/1996 | Iwaki et al. |
| D375,015 S | 10/1996 | Kobayashi et al. |
| D375,864 S | 11/1996 | Taniyama |
| D385,145 S | 10/1997 | VerWeyst et al. |
| D391,437 S | 3/1998 | Moore et al. |
| D392,500 S | 3/1998 | McEwan |
| 5,740,155 A | 4/1998 | Spector |
| D395,190 S | 6/1998 | Roth et al. |
| 5,799,784 A | 9/1998 | Bosworth |
| D401,463 S | 11/1998 | Cheris et al. |
| D406,719 S | 3/1999 | Clausen |
| 5,931,294 A | 8/1999 | Weingarden et al. |
| 5,944,185 A | 8/1999 | Burdett et al. |
| 5,976,457 A * | 11/1999 | Amaya et al. | 419/36 |
| D419,359 S | 1/2000 | Eguchi et al. |
| D420,240 S | 2/2000 | Sorenson et al. |
| D420,832 S | 2/2000 | Cole, Sr. |
| D422,428 S | 4/2000 | Pijanowski et al. |
| D422,445 S | 4/2000 | Markowitz |
| D422,455 S | 4/2000 | Kato |
| D426,721 S | 6/2000 | Benden, Jr. et al. |
| 6,164,446 A | 12/2000 | Law |
| D437,505 S | 2/2001 | Fraser et al. |
| D440,108 S | 4/2001 | Derman |
| 6,227,362 B1 | 5/2001 | Cheung |
| D450,973 S | 11/2001 | Bieda |
| D452,104 S | 12/2001 | Tang |
| D452,105 S | 12/2001 | Chan |
| D452,793 S | 1/2002 | Lee |
| D453,081 S | 1/2002 | Yu |
| D455,595 S | 4/2002 | Ikeda et al. |
| D456,201 S | 4/2002 | Hummell et al. |
| 6,374,648 B1 | 4/2002 | Mitsuyama |
| D459,935 S | 7/2002 | Takahashi et al. |
| 6,412,631 B2 | 7/2002 | Belden, Jr. |
| 6,450,332 B1 | 9/2002 | Courchesne |
| D465,960 S | 11/2002 | Yau |
| 6,474,470 B2 | 11/2002 | Byrne et al. |
| D470,707 S | 2/2003 | Lopez Mas |
| 6,619,079 B2 | 9/2003 | Cheung |
| D481,251 S | 10/2003 | Yau |
| D484,352 S | 12/2003 | Palmer |
| D492,535 S | 7/2004 | Hiramatsu |
| D493,661 S | 8/2004 | Yau |
| 6,782,940 B2 * | 8/2004 | Billiet et al. | 264/220 |
| D495,913 S | 9/2004 | Hsiao |
| D497,074 S | 10/2004 | Dardashti |
| D497,508 S | 10/2004 | Dardashti |
| D505,565 S | 5/2005 | Chen |
| 6,907,987 B2 | 6/2005 | Lee |
| D518,676 S | 4/2006 | Lee et al. |
| 7,028,835 B1 | 4/2006 | Rajter, Jr. |
| 7,044,296 B2 | 5/2006 | Solling |
| D522,791 S | 6/2006 | Ho |
| 7,192,000 B2 * | 3/2007 | Mak | 249/134 |
| 7,320,235 B2 | 1/2008 | Belden, Jr. et al. |
| D570,635 S | 6/2008 | Pozzoli |
| D572,962 S | 7/2008 | Freitag et al. |
| D572,963 S | 7/2008 | Gelardi et al. |
| D572,964 S | 7/2008 | Gelardi et al. |
| D573,831 S | 7/2008 | Gelardi et al. |
| 7,401,636 B2 * | 7/2008 | O'Donnell et al. | 164/137 |
| 7,416,079 B2 | 8/2008 | Osborn et al. |
| 7,428,968 B2 | 9/2008 | Osborn et al. |
| 2002/0033348 A1 | 3/2002 | Flores, Jr. et al. |
| 2002/0038769 A1 | 4/2002 | Hegarty et al. |
| 2002/0187065 A1 * | 12/2002 | Amaya et al. | 419/8 |
| 2003/0029761 A1 | 2/2003 | Onmori et al. |
| 2003/0075463 A1 | 4/2003 | Perez et al. |
| 2003/0106814 A1 | 6/2003 | Gelardi et al. |
| 2003/0116455 A1 | 6/2003 | Marsilio et al. |
| 2003/0121296 A1 | 7/2003 | Cheung |
| 2003/0132126 A1 | 7/2003 | Parrotta et al. |
| 2003/0146119 A1 | 8/2003 | Lee |
| 2003/0169680 A1 | 9/2003 | Volan et al. |
| 2003/0196916 A1 | 10/2003 | Jakobowicz |
| 2004/0108230 A1 | 6/2004 | Hsu |
| 2004/0188286 A1 | 9/2004 | Lax et al. |
| 2004/0195123 A1 | 10/2004 | Bird et al. |
| 2004/0245128 A1 | 12/2004 | MacColl et al. |
| 2005/0077196 A1 | 4/2005 | Corley et al. |
| 2005/0121950 A1 | 6/2005 | Hegarty et al. |
| 2005/0160774 A1 | 7/2005 | Weinstein et al. |
| 2005/0230274 A1 | 10/2005 | Preece et al. |
| 2005/0241970 A1 | 11/2005 | Choi |
| 2006/0124479 A1 | 6/2006 | Osborn et al. |
| 2006/0191809 A1 | 8/2006 | Heuser et al. |
| 2007/0163902 A1 | 7/2007 | Osborn et al. |
| 2007/0267305 A1 | 11/2007 | Johnston et al. |
| 2008/0011625 A1 | 1/2008 | Gelardi et al. |
| 2008/0156682 A1 | 7/2008 | Choi et al. |
| 2008/0289980 A1 | 11/2008 | Johnston |
| 2009/0032416 A1 | 2/2009 | Osborn et al. |

FOREIGN PATENT DOCUMENTS

| | | |
|---|---|---|
| EP | 0 765 734 A | 4/1997 |
| FR | 2859189 A1 | 5/2005 |
| GB | 2 242 387 A | 10/1991 |
| NL | 1 019 235 C2 | 4/2003 |
| WO | WO9312993 A1 | 7/1993 |
| WO | WO9849684 A1 | 11/1998 |
| WO | WO9959153 A1 | 11/1999 |
| WO | 0143132 A1 | 6/2001 |
| WO | WO2006058119 A1 | 6/2006 |
| WO | WO2007133591 A2 | 11/2007 |

\* cited by examiner

METHOD OF MAKING AN INJECTION MOLDED CONTAINER

TECHNICAL FIELD

This invention relates to a method of making an injection moulded container for housing information storage media, to containers made by the method and to mould tools for use in said method.

BACKGROUND ART

Containers comprising a base portion and a lid portion moveable about a spine portion between an open and a closed configuration and having holding means for holding information storage media within the container are well known. One widely used container of this type is a container for housing DVDs.

The industry has adopted DVD containers having substantially uniform external dimensions so they are readily recognised by the consumer as containing a DVD (rather than, for instance, a music CD) and so they are compatible with both display systems used in retail outlets and storage devices used by the consumer. The moulds used for making such injection moulded containers are made to a very high specification so as to be able to reliably fabricate hundreds of thousands, or millions, of containers to the desired quality. Fabrication of such tools is thus very expensive and can take a considerable length of time (typically several months).

For the above reasons, the containers produced by a given manufacturer tend to be relatively standardized. However, the studios providing the content of a DVD, e.g. particular software or a particular movie or film, also have a desire for their products to be readily identifiable and distinguishable when presented to the consumer, e.g. in a retail outlet. The present invention aims to provide a technical solution to these conflicting requirements.

SUMMARY OF INVENTION

According to a first aspect of the invention, there is provided a method of making an injection moulded container for housing information storage media, the container comprising a base portion and a lid portion moveable about a spine portion between an open and a closed configuration and holding means for holding the information storage media within the container, the method involving the use of an injection moulding tool comprising two carrier units each of which is adapted to receive a plurality of inserts therein which together define a cavity for forming the container: a first set of the inserts for forming a first set of features of the container being formed of a first material and a second set of Inserts for forming a second set of features of the container being formed of a second material, the first set of inserts being machined to the required shape for fitting within the carrier units and for forming the first set of features and the second set of inserts being machined so as to fit within the carrier units but one or more of the second set of inserts being formed with excess material on surfaces thereof defining said second set of features pending a decision as to the precise shape of said second set of features, whereby once said decision has been made the tool can be completed by machining said excess material to the required shape and assembling the inserts in the mould.

The invention also relates to containers made by this method. In addition, the invention provides a plurality of such injection moulded containers each being similar apart from some having a first set of customer specific features and some having a second set of customer specific features (differing from the first set).

The invention also relates to a mould tool for use in the above method and, in particular, to a mould tool comprising a first set of inserts for forming a first set of features and a plurality of second sets of inserts each second set being for forming a different set of customer specific features.

Preferred and optional features will be apparent from the following description and from the subsidiary claims of the specification.

BRIEF DESCRIPTION OF DRAWINGS

The invention will now be further described, merely by way of example, with reference to the accompanying drawings, in which.

DESCRIPTION OF PREFERRED EMBODIMENTS

Figure 1A:
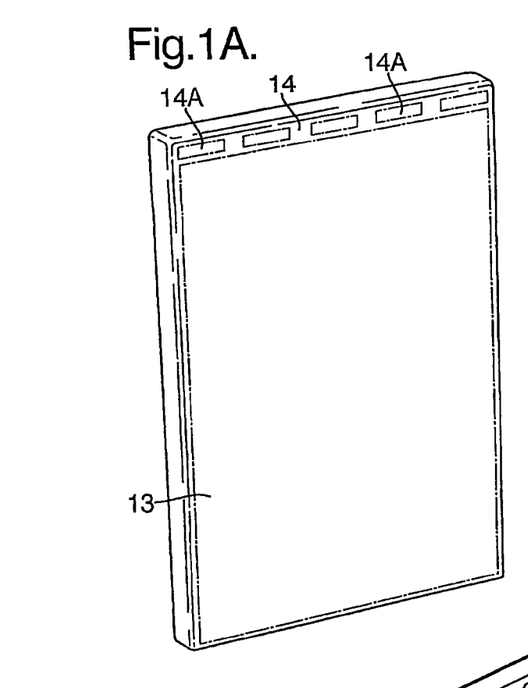
FIG. 1A is a perspective view of the exterior of a DVD container according to a first embodiment of the invention (shown closed) and FIG. 1B is a perspective view of the interior of the container (shown in an open position)

FIG. 1 shows a first embodiment of a DVD container according to the present invention comprising a base portion 10 connected to a lid portion 11 by a spine portion 12. This is similar to a known DVD container except that a clear plastic film attached to the exterior of the container and cover sheet 13 (shown blank in FIG. 1) positioned behind the film does not cover the entire front face of the container but, instead, leaves a band 14 at the top where the outer surface of the container remains exposed. The band 14 extends across the front face of the container, around the spine and across the rear face of the container. This band 14 is available for customized moulding, e.g. of graphics or logos. In the example shown, a series of words (represented by areas 14A) are moulded in the area of the band 14 on the front face of the container. These may, for example, be the name of the studio, movie or artist. Alternatively, or additionally, logos or other symbols of a more 3-dimensional nature may be moulded in the area of the band 14, e.g. projecting therefrom by up to 3 mm. Alternatively or additionally, the surfaces of the container in the area of the band 14 may be customized so as to have a distinctive shape or appearance, e.g. the edges, corners and/or faces thereof may be formed with various convex, concave or angular features (but not the external surfaces formed by steel inserts 50, 51, 52, 53—see below). Preferably, this band around the upper end of the container stands proud, e.g. by 0.5-1.0 mm, of the adjacent surfaces of the container.

A similar band (not shown) which is not covered by a film and cover sheet 13 may be provided around the lower end of the container (either in place of the band at the upper end or in addition thereto).

In a further arrangement, the film and cover sheet 13 may be omitted so the major faces of the lid, spine and base portions may be provided with customised features at any position thereon.

Figure 1B:
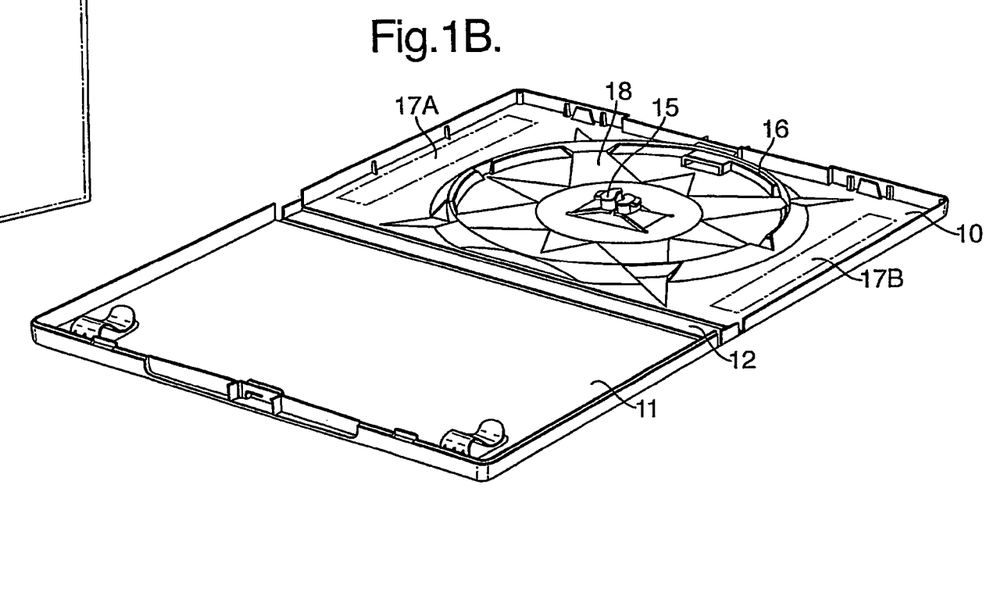
Figure 2:
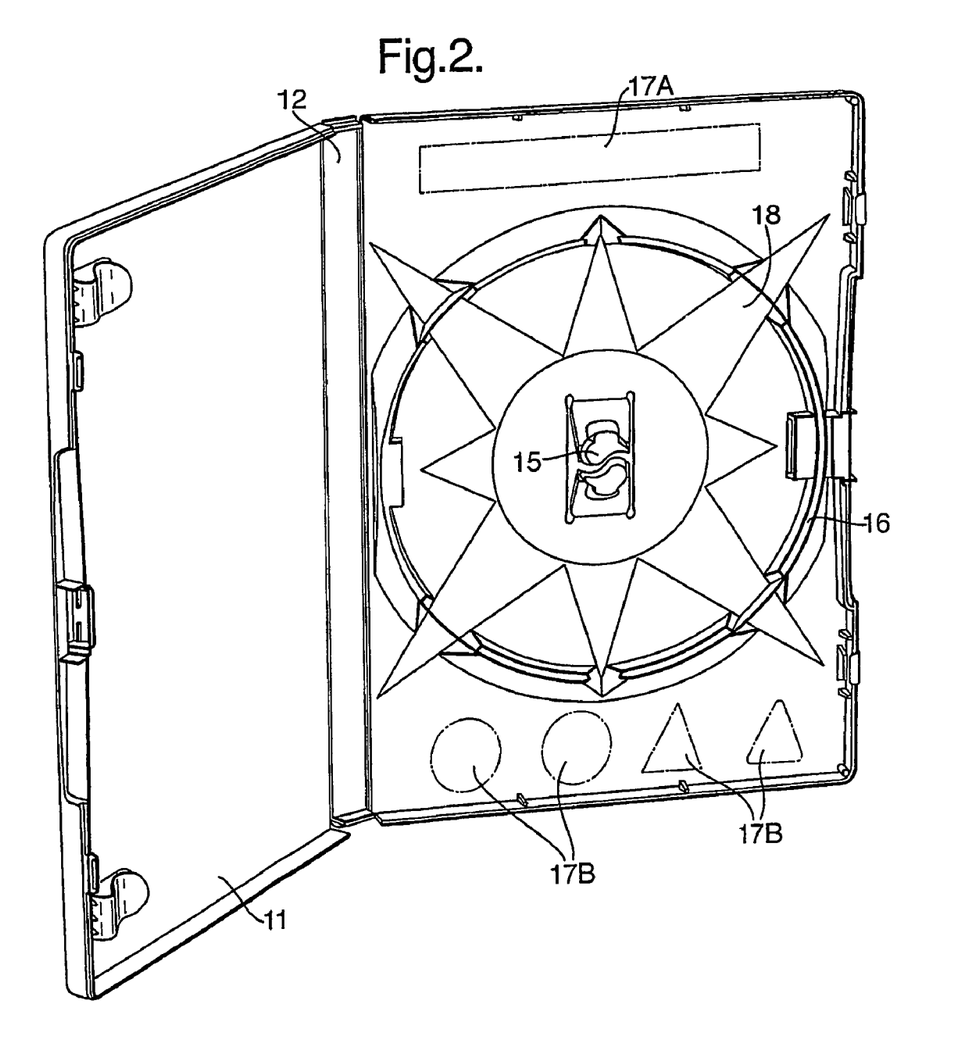
FIG. 2 is a further perspective view from a different angle of the interior of the DVD container of FIG. 1 (shown in an open position)

FIG. 1B and FIG. 2 show the interior of the container. A hub 15 is provided on the interior of the base portion 10 for receiving a DVD (or HD DVD) and a circular upstand 16 is provided for surrounding the periphery of the DVD. In the embodiment shown, the upstand 16 is positioned substantially centrally in the base portion 10 so spaces 17A and 17B are left at either end of the base portion. Internal graphics features may be formed in the areas 17A and 17B (outlined by dash-dot lines in the Figures). Graphics, or other customised features can, however, be formed anywhere on the internal faces of the base, spine and lid portions (apart from those areas which are formed by steel inserts, e.g. inserts 54, 56, 57—see below). The illustrated embodiment shows a star shape 18 moulded on the base portion within the area defined by the circular upstand 16 and extending beyond this (together with customised V-shaped grooves formed within the upstand 16). It is known to mould graphics features in areas such as those shown at 17A and 17B but the present invention enables this to be done in a manner which enables the mould tool used to form the container to be easily and rapidly modified or customized to provide specific features in these areas. Instead of having to make a new tool or modify an existing tool by re-machining parts thereof to provide specific features, the desired features can be provided by substituting one set of inserts for another set of inserts. Moreover, the present invention enables this to be done within a shorter time frame than has previously been possible. By pre-forming inserts for the tool so they are ready to be inserted therein but leaving excess material on the surfaces thereof defining areas in which customisable features can be formed, the tool can be completed merely by machining said excess material to the required shape and assembling the inserts into the mould.

In a preferred embodiment, the inserts used to form the customisable features are formed of a relatively soft material, e.g. a copper alloy, so they can be easily and rapidly machined to the required shape. In contrast, other features of the container are typically formed by inserts formed of a steel alloy. Machining of steel inserts typically requires the insert to be machined to the approximate shape required, then heat-treated to harden the steel. The material tends to warp during heat treatment so then goes through a second machining process to form the final shape. As indicated above, it can typically take several months to fabricate steel mould components in this manner. In contrast, copper based alloys (e.g. moldMAX® made by Brush Wellman Inc) can be machined relatively easily and in one-stage and so can typically be fabricated in a few weeks rather than a few months. This is particularly so in moulding apparatus having more than one mould cavity, e.g. a 4-cavity machine having 4 identical cavities which are used simultaneously in each mould cycle.

In a preferred method according to the present invention, once machining of the copper alloy inserts is complete, they are provided with a hard coating, e.g. of a nickel or titanium alloy, at least over surfaces thereof which define the shape of a part of the container, preferably with an additional outer coating of chromium to provide resistance to tarnishing.

The method thus enables the container manufacturer to rapidly modify the injection moulding tool to provide customized features, e.g. for DVDs relating to a specific film or movie. The ability to modify the tool within a few weeks enables this to be achieved whereas, in many cases. If the tool modification takes months, the needs of this market are difficult to meet.

Figures 3A, 3B:
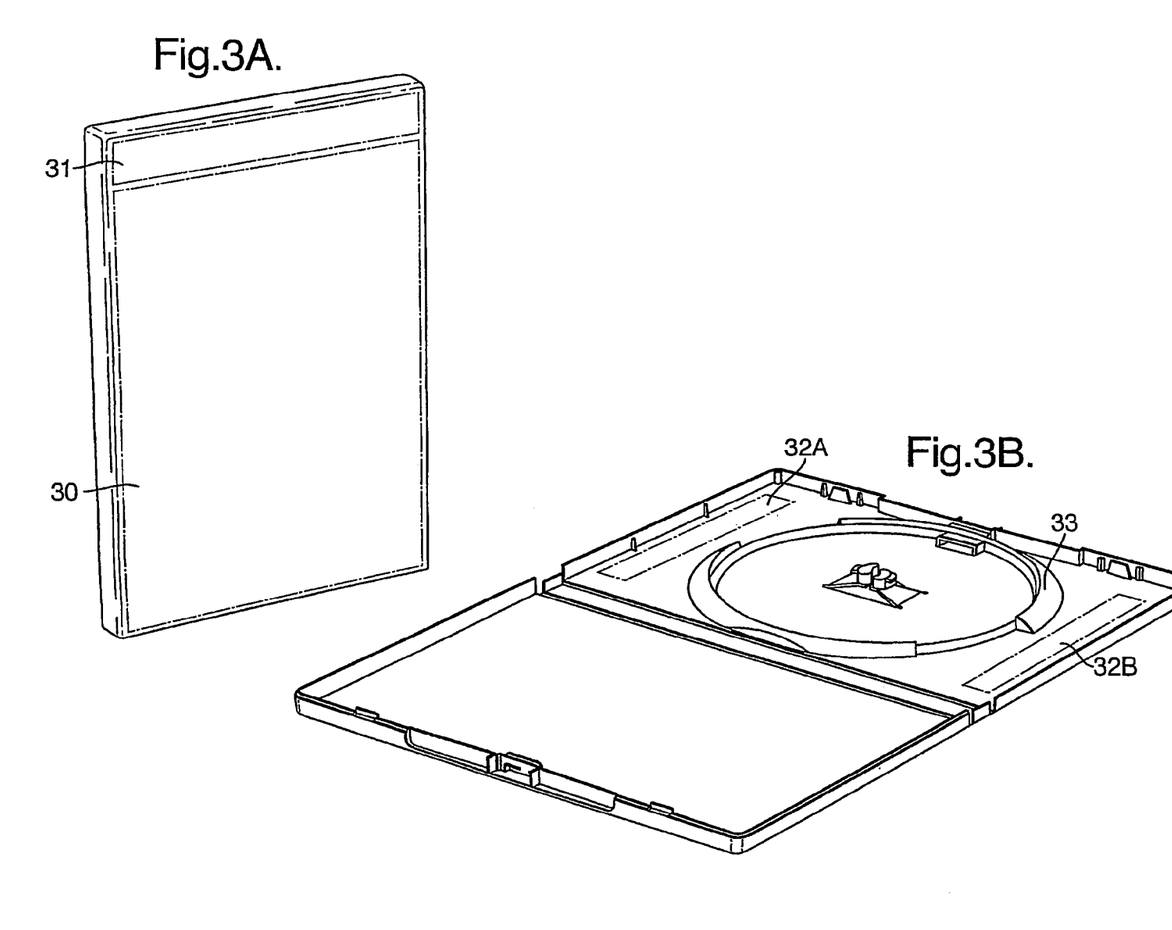
FIG. 3A is a perspective view of the exterior of a DVD container according to a second embodiment of the invention (shown closed) and FIG. 3B is a perspective view of the interior of the container of FIG. 3A (shown in an open position)
Figure 4:
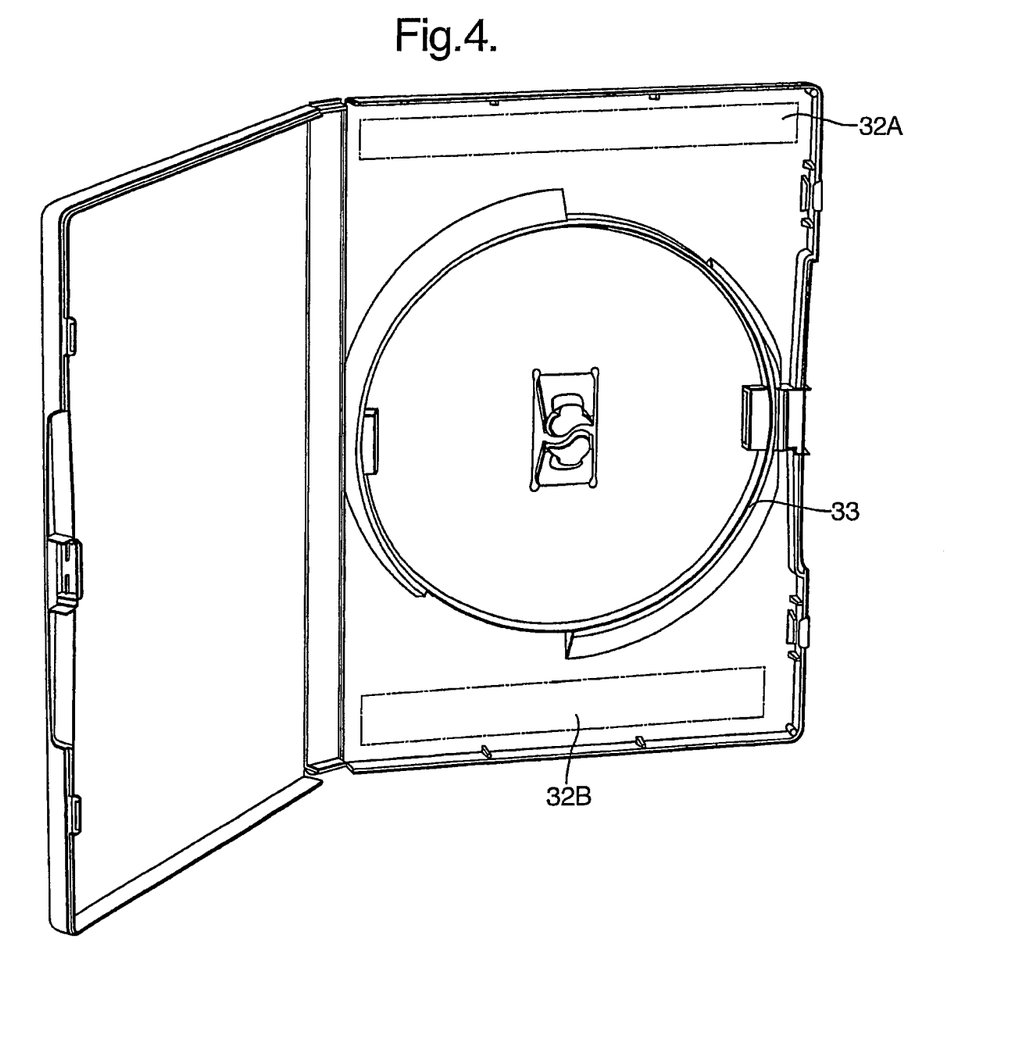
FIG. 4 is a further perspective view from a different angle of the interior of the container shown in FIGS. 3A and 3B (in an open position)

FIGS. 3A, 3B and 4 show another embodiment of a DVD container having specific customized features. As for the embodiment described above, the exterior of the case has an area 30 in which a conventional display is provided by a printed sheet positioned behind a clear film attached to the exterior of the container and a second area 31 in the form of a band, adjacent the upper end of the container, where the external surface of the injection moulded container is exposed and where customised features can be formed.

In the interior of the container, customised features are formed in flat areas, eg as indicated at 32A and 32B, on the exposed surfaces of the interior of the base portion outside an upstand 33. A logo may, for example, be moulded in area 32A and the name of a film or series to which the DVD to be housed in the container relates may be moulded in area 32B. In addition, as best shown in FIG. 4, the shape of the upstand 33 may be customized, e.g. to tie in with a feature of the logo or movie. In the example shown, the upstand has a substantially circular inner edge but comprises two portions of tapering width spaced 180° from each other. It will be appreciated that the upstand can be formed in a wide variety of other shapes and forms with little or no effect on its function. Preferably, the inner edge of the upstand is circular, or partially circular, but away from this inner edge both its shape and gaps within it can vary considerably.

Preferably, the customisable inserts form static features of the container, i.e. features which are fixed relative to the base portion, spine portion or lid portion. Other features, which need to be formed with a very high degree of accuracy and/or the shape of which requires more complex moulding techniques, are preferably made with steel inserts or components. Such features are thus likely to be the same in all customised containers formed by a method in accordance with the present invention.

The static features may typically comprise:
(i) specific external features of the box, e.g. the shape of the exposed upper end of the box and/or features moulded in the band described above
(ii) internal graphics features, e.g. names, logos or trade marks, moulded in the major internal surface of the base portion,
(iii) the shape of an upstand surrounding the periphery of the DVD.

Figure 5:
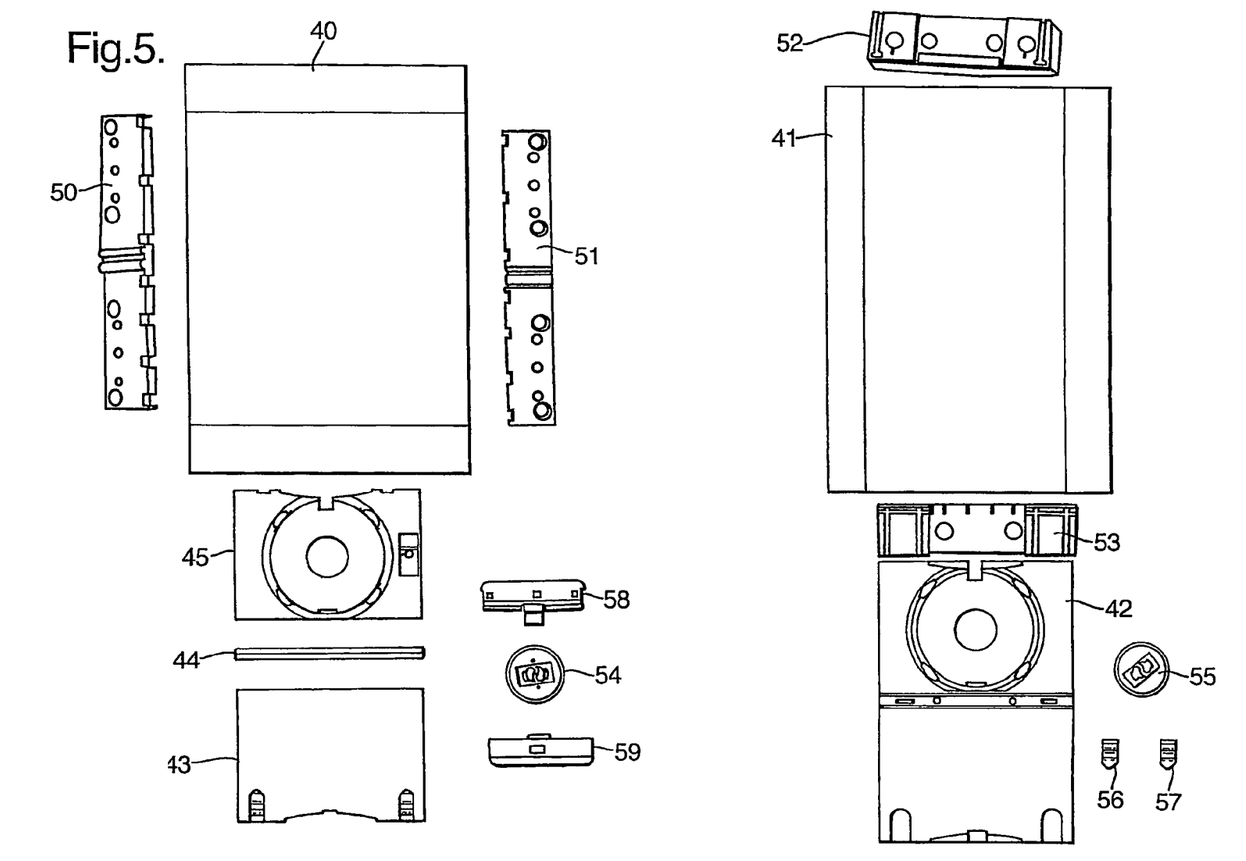
FIG. 5 is a schematic, plan view of components used in making up an injection moulding tool according to a preferred form of the invention.

FIG. 5 shows a schematic plan view of components of an embodiment of two halves of a mould tool according to the present invention (although some components are shown in perspective view). The tool comprises two carrier units 40, 41 to which the various mould inserts are assembled (e.g. by being bolted or screwed thereto). The carrier units 40, 41 are in turn fastened to the bolsters of a moulding machine (not shown). The provision of carrier units 40, 41 enables the configuration of inserts used in the mould to be easily and rapidly changed.

Two sets of inserts are provided for attachment to the carrier units 40, 41: a first set defining a first set of features, and a second set defining a second set of features. As described above, the first set of inserts is made from a first material, e.g. a steel, and the second set of inserts is made from a second material, e.g. a copper alloy.

In the example shown, the second set of Inserts comprises: an exterior insert 42 for forming some of the features of the major external faces of the container, an interior lid insert 43 for forming the interior of the lid portion, an interior spine insert 44 for forming the interior of the spine portion, and an interior base portion 45 for forming some of the features of the interior of the base portion. The first set of inserts includes: exterior edge inserts 50, 51, 52, 53 for forming the external surfaces of the edges of the container, internal and external hub inserts 54, 55 for forming the internal and external features of a disk holding hub, booklet clip inserts 56, 57 for forming external surfaces of resilient booklet clips (typically provided in the lid portion of DVD boxes to hold a booklet or other documents), and opening edge inserts 58, 59 for forming features of the opening edge of the container. Exterior edge inserts 50 and 52 are illustrated in perspective view.

The first set of inserts may include a variety of other members but these are not shown in order to simplify the description.

It will be appreciated that the members of the first and second sets of inserts fit together within the carrier units 40, 41 to form the two halves of a mould cavity for defining the shape of the container to be formed therein. In some cases, the members fit adjacent each other, in other cases one member fits within another (it will be seen from FIG. 5, for example, that the hub insert 55 and booklet clip inserts 56, 57 fit within corresponding apertures in the exterior insert 42).

A further possibility is to replace one or more of the steel inserts by a further insert. This further insert may be formed of steel, e.g. if it takes the form of a blank when, for example, it is desired to make a container without booklet clips in the lid portion, or when it is desired to provide a limited number of options in the standard features of the container, for example it it is desired to provide the option of two forms of hub (such as a 2-arm hub or a 3-arm hub). In other cases, if customised features are required, one or more of the steel inserts may be replaced by a customised insert of a softer material.

The mould is preferably designed so that the majority of clamping forces used to clamp the two halves of the mould together are borne by the insert carriers 40, 41 and/or by steel inserts rather than the second set of inserts which are made of a relatively soft material. For this reason, it is desirable for the edge inserts 50, 51, 52 and 53 which form the periphery of the mould cavity, to be formed of steel. It is also possible to replace steel inserts such as edge inserts 50, 51, 52 and 53 with customised steel inserts. However, whilst manufacture and replacement of steel inserts will be quicker than fabricating an entirely new steel mould, such steel inserts take longer to manufacture than inserts of a softer material so this would lead to a partial loss of the time advantages discussed above.

A further advantage of the above arrangement of inserts is that if the second set of inserts are formed of a material having a relatively high thermal conductivity (such as a copper alloy), this assists in cooling the mould after the injection of plastics material therein and so assists in shortening the cycle time of each mould cycle.

As explained above, the container manufacturer is able to pre-prepare moulds for making customized containers. All the first set of mould inserts can be completed. As these form features which are common to all containers to be formed in the mould they can be made in advance of an anticipated need for a customised container. The second set of mould inserts are also part-machined so they fit in the mould and are ready for use apart from final machining of the excess material left on the surfaces where customised features may be required.

The container manufacturer will thus have for each mould, a first set of mould inserts for the common features and a plurality of sets of second mould inserts some sets including the excess material (ready for machining to a customised shape) and other sets in which a customised shape has been machined but which have been removed from the mould whilst a different second set of inserts are in use. As the inserts are readily removable, a mould can be set up for a specific mould run, e.g. of a hundred thousand containers, and once this has been completed, the second set of inserts can be changed for a different set ready for fabricating another container with a different set of customised features.

Because of the relative ease with which the second set of inserts can be manufactured and the relative ease of re-configuring the mould tool, the arrangement described above enables the container manufacturer to be much more adaptable and to be able to respond to specific container requirements at relatively short notice and at relatively little additional expense. The arrangement also enables a relatively short run, e.g. of one hundred thousand containers, of a specific, customised form of container to be economic (rather than requiring a run of several hundreds of thousands or millions of containers to achieve this).

The invention claimed is:

1. A method of making an injection moulded container for housing information storage media, the container comprising a base portion and a lid portion moveable about a spine portion between an open and a closed configuration and holding means for holding the information storage media within the container, the method involving the use of an injection moulding tool comprising two carrier units each of which is adapted to receive a plurality of inserts therein which together define a cavity for forming the container: a first set of the inserts for forming a first set of features of the container being formed of a first material and a second set of inserts for forming a second set of features of the container being formed of a second material, the first set of inserts being machined to the required shape for fitting within the carrier units and for forming the first set of features and the second set of inserts being machined so as to fit within the carrier units but one or more of the second set of inserts being formed with excess material on surfaces thereof defining said second set of features pending a decision as to the precise shape of said second set of features, whereby once said decision has been made the tool can be completed by machining said excess material to the required shape and assembling the inserts in the mould.

2. A method as claimed in claim 1 in which one or more of the second set of features is changed by replacing one or more of said second set of inserts by one or more further inserts with the excess material thereon machined to different shape.

3. A method as claimed in claim 1 in which the second set of features comprise static features on the base, lid or spine portions.

4. A method as claimed in claim 1 in which the second set of features comprises one or more of the following: specific external features, internal graphic features, and a surround for extending around the periphery or part of the periphery of information storage media held within the container.

5. A method as claimed in claim 4 in which container is provided with a film or sleeve extending around the exterior thereof for receiving an information sheet, the film or sleeve extending over the majority of external faces of the lid portion, base portion and spine portion apart from a band at one end (or both ends) of the container, said band remaining uncovered by said film or sleeve to provide an area in which said specific external features can be formed.

6. A method as claimed in claim 5 in which said band stands proud of the adjacent areas of the external surfaces of the container area (over which the film or sleeve is provided).

7. A method as claimed in claim 1 in which the container is adapted to hold information storage media in the form of a disk.

8. A method as claimed in claim 7 in which the holding means comprises a hub for releasably engaging the disk via a central aperture therein, the hub being one of said first set of features.

9. A method as claimed in claim 8 in which a surround for extending around the periphery or part of the periphery of information storage media held within the container comprises a substantially circular or part circular upstand for extending around the periphery of a disk held on said hub.

10. A method as claimed in claim 9 in which the surround has an inner edge adjacent the periphery of the disk which is substantially circular or part circular and an outer edge which is non-circular or partially non-circular.

11. A method as claimed in claim 9 in which the base portion has a substantially flat, inner surface and said upstand projects from said surface.

12. A method as claimed in claim 11 in which said inner surface is rectangular, the width of the rectangle being of sufficient size to receive the diameter of said disk and the length of the rectangle being of sufficient size to receive the diameter of said disk with a space left at one or both ends of the rectangle, said spaces providing an area or areas in which said internal graphics features can be formed.

13. A method as claimed in claim 1 in which the first material is a hard material whereas the second material is a softer material.

14. A method as claimed in claim 1 in which the first material is a steel.

15. A method as claimed in claim 1 in which the second material is a copper alloy.

16. A method as claimed in claim 15 in which, following machining of said excess material, the surfaces of the second set of components defining the shape of the second set of features are provided with a hard coating.

17. A method as claimed in claim 16 in which said coating comprises a nickel or titanium alloy with an additional outer coating of chromium.

* * * * *